United States Patent

[11] 3,618,048

[72] Inventors Keith S. Pennington
Putnam Valley, N.Y.;
William E. Glenn, Jr., Stamford, Conn.
[21] Appl. No. 747,586
[22] Filed July 25, 1968
[45] Patented Nov. 2, 1971
[73] Assignee General Electric Company

[54] RANDOM ACCESS LARGE-CAPACITY MEMORIES
21 Claims, 4 Drawing Figs.

[52] U.S. Cl. ........................................................ 340/173,
346/77.5, 350/161
[51] Int. Cl. ........................................................ G11c 11/46
[50] Field of Search ............................................ 350/160,
161, 162; 340/173 LT, 173 MA; 250/219

[56] References Cited

UNITED STATES PATENTS

| | | | |
|---|---|---|---|
| 3,078,338 | 2/1963 | Glenn | 340/173 |
| 3,281,798 | 10/1966 | Glenn | 340/173 |
| 3,312,955 | 4/1967 | Lamberts | 340/173 |
| 3,325,789 | 6/1967 | Glenn | 340/173 |
| 3,328,776 | 6/1967 | Hughes et al. | 340/173 |
| 3,392,400 | 7/1968 | Lamberts | 346/1 |

*Primary Examiner*—Terrell W. Fears
*Attorneys*—Richard R. Brainard, Marvin Snyder, Paul A. Frank, Frank L. Neuhauser, Oscar B. Waddell and Melvin M. Goldenberg

ABSTRACT: Information is recorded in digital form by employment of scanned radiation to produce frames of diffraction gratings on a recording medium, with modulation signals controlling spacing between grating lines. Recorded frames are then arranged in a matrix, and the resulting memory is interrogated by illuminating the desired frame with a beam of coherent light. Random access retrieval of data is accomplished by impinging light from the interrogated frames onto photodetecting means.

INVENTORS:
KEITH S. PENNINGTON
WILLIAM E. GLENN, Jr., by Marvin Snyder
THEIR ATTORNEY INVENTORS:
KEITH S. PENNINGTON
WILLIAM E. GLENN, Jr., by Marvin Snyder
THEIR ATTORNEY

RANDOM ACCESS LARGE-CAPACITY MEMORIES

INTRODUCTION

This invention relates to data storage and retrieval, and more particularly to a random access data storage system wherein information is stored in the form of optical diffraction gratings and beams of energy are employed in both data storage and retrieval.

Random access memories which permit high bit storage density and facilitate rapid storage and retrieval of data are desirable in many different types of digital apparatus. Recently, superimposed angularly oriented optical diffraction gratings have been employed in data storage apparatus such as described in J. E. Bigelow application Ser. No. 717,848, filed Apr. 1, 1968 and assigned to the instant assignee. Storage of information in the form of diffraction gratings provides a distinct advantage in achieving high-density bit storage, since the stored information is thus rendered relatively immune to erasure or damage due to localized dust particle deposition and minute flaws in the recording medium. Moreover, the readout signal is relatively insensitive to the position of the gratings in the input plane. Heretofore, however, optical diffraction gratings have been used to record information as a varying photographic density, making the system highly susceptible to generation of higher order diffraction images. In such system, due to the nonlinear nature of the recording process, it is difficult to record a large number of bits or frequencies and still remain in the linear response region of the recording medium; hence, the tendency is to generate higher order or spurious frequencies, effectively rendering unuseable a large portion of the space-bandwidth product of the medium. The space-bandwidth product is here taken to mean the product of recording space on the medium and the widest band of grating line frequencies which may be recorded on the medium.

The present invention provides increased storage capacity for data storage systems employing optical diffraction gratings by substantially avoiding generation of higher diffracted orders; that is, by maintaining higher diffracted order intensities negligible, a larger amount of the bandwidth-recording capability of the recording medium can be utilized. The information is recorded in tracks across a photosensitive or electron-sensitive medium by a laser beam or electron beam respectively, in the form of a complex diffraction grating which is periodic along the track. The complex diffraction grating is derived from a linear superposition of simple frequencies. However, since the grating is produced by frequency modulation rather than amplitude modulation, spacing between adjacent grating lines is modulated in lieu of grating line density where recording takes place on a photographic-recording medium and in lieu of grating line depth where recording takes place on a deformation recording medium. Effectively, therefore, the diffraction grating is phase modulated, permitting the system to be so adjusted that recording transpires in the linear response frequency range of the medium and hence drastically reduces intensity of higher order diffracted waves. By eliminating these higher order diffracted waves, use may be made of that portion of the frequency spectrum which would otherwise be occupied by the higher orders.

Accordingly, one object of the invention is to provide a large capacity random access memory capable of permitting rapid storage and retrieval of data in digital form.

Another object is to provide a system for storage of date in the form of diffraction gratings wherein large storage capacity is achieved by avoiding appreciable generation of higher diffracted orders.

Another object is to provide means for storing data in the form of line gratings wherein modulation is contained solely in the spacing between adjacent lines.

Briefly, in accordance with a preferred embodiment of the invention, a random access system for data storage and retrieval is provided. The system comprises a radiation-responsive medium and means for recording optical diffraction gratings on the radiation-responsive medium wherein grating lines are spaced apart in accordance with data to be stored. Optical means for retrieving data from the medium are also provided, and comprise a source of substantially monochromatic light, means for selectively directing the monochromatic light through any one of the recorded gratings, photodetecting means, and means for focusing light emanating from the gratings onto the photodetecting means so as to produce electrical output signals from the photodetecting means in accordance with the data being retrieved from the medium.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings in which:

DESCRIPTION OF TYPICAL EMBODIMENTS

Figure 1:
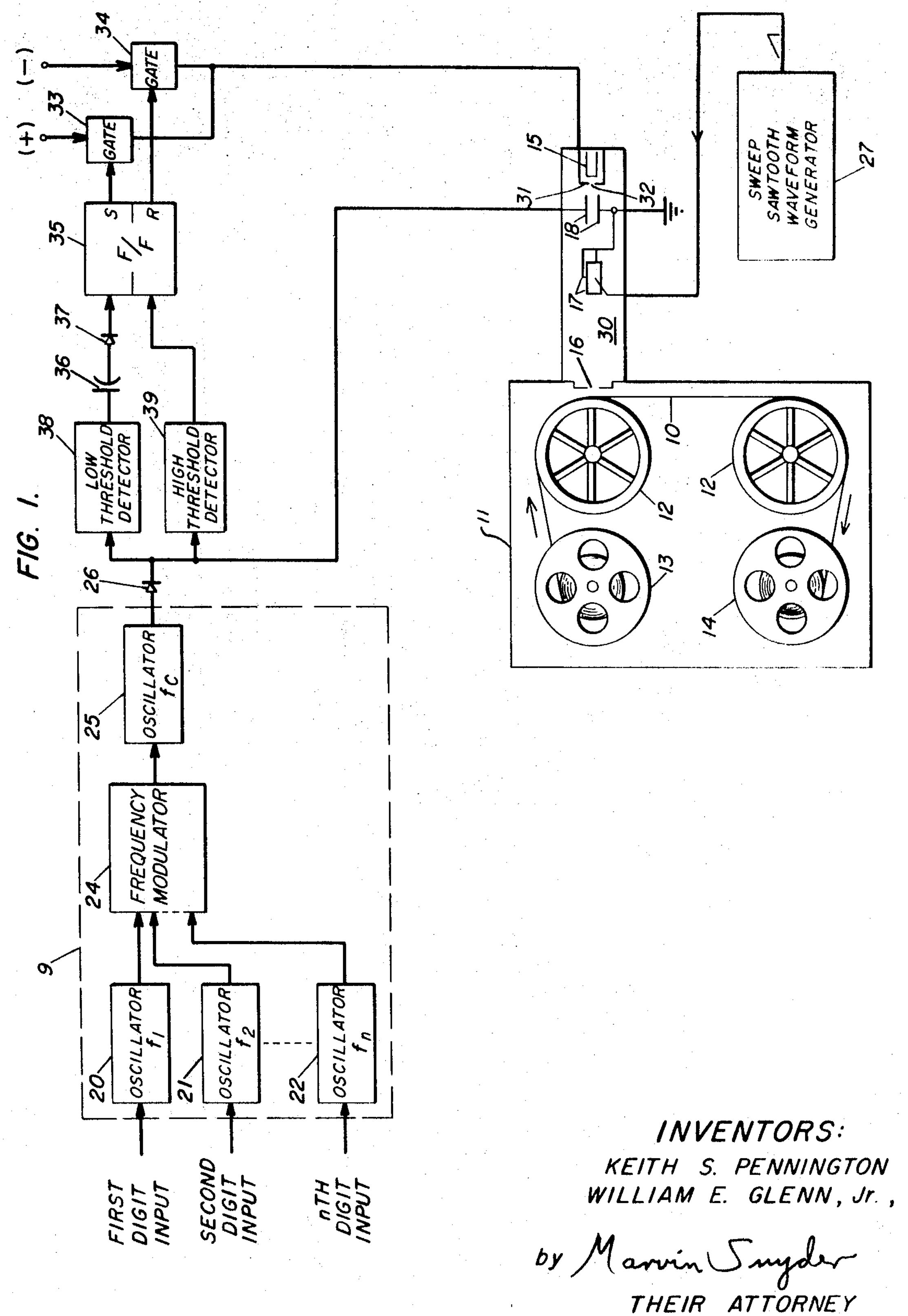
FIG. 1 is a block diagram of apparatus for recording data in the form of optical diffraction gratings on a radiation-responsive medium.

In FIG. 1 a system for recording data on a radiation-responsive medium is illustrated. The system includes apparatus 9 for frequency modulating a carrier signal in accordance with a plurality of modulating signals, each modulating signal representing a separate bit of data. The frequency-modulated carrier signal is then employed to deflect a recording electron beam in directions parallel to the direction of travel of the recording medium, herein referred to as the vertical direction. Thus, a photosensitive-recording medium 10 is contained within an evacuated recording chamber 11 of the type described in detail in W. E. Glenn, Jr. U.S. Pat. No. 3,113,179, issued Dec. 3, 1963 and assigned to the instant assignee. The recording medium, which is herein assumed to comprise a film coated with thermoplastic material, is driven by a pair of rotatable capstans 12, the surfaces of which are heated by the flow of hot liquid or vapor, such as steam, in pipes secured to the interior (not shown) of each capstan. A detailed description of the thermoplastic film and the apparatus for heating the capstans is set forth in the aforementioned U.S. Pat. No. 3,113,179, and is herein incorporated by reference. The film is furnished to capstans 12 from a payout reel 13 and is taken up from the capstans by a takeup reel 14. It should be noted that other forms of electron-sensitive or photosensitive-recording media 10 may be employed as the radiation-responsive medium in the instant invention.

Recording is typically accomplished by employment of an electron beam originating from an electron source such as a thermionic cathode 15 situated at one end of an elongated region 30 of recording chamber 11. An anode electrode 31, having a small hole 32 through which the electron beam passes, serves as a means for accelerating electrons of the electron beam in conventional fashion. At the opposite end of elongated region 30 is a slotted aperture 16 which has its length approximately equal to, and in registration with, the width of thermoplastic film 10. Aperture 16, which permits maintenance of a pressure differential on either side thereof, if desired, is sufficiently wide to permit passage of the electron beam therethrough with enough room to allow displacement of the electron beam over a distance equal to the vertical length of the lines of the diffraction gratings to be recorded. Horizontal deflection of the electron beam is accomplished by means of a pair of electrostatic deflection plates 17, while vertical deflection of the electron beam is accomplished by a pair of electrostatic deflection plates 18 oriented orthogonally with respect to deflection plates 17. Although electrostatic deflection means are shown for producing controlled displacement of the electron beam from electron source 15, those skilled in the art will recognize that, in the alternative, electromagnetic deflection of the electron beam may also be utilized. For simplicity, focusing means, being well known to those skilled in the art, have been omitted from the illustration. For additional details regarding the construction of recording chamber 11, reference should be made to the aforementioned W. E. Glenn, Jr. patent.

Each bit to be recorded is represented by a separate oscillator operating at a unique frequency. Thus, a signal of frequency $f_1$ representing the first bit or digit is produced by an oscillator 20. A second frequency $f_2$ representing the second digit or bit is produced by an oscillator 21. Thus, a large plurality of frequencies, respectively representative of a large plurality of bits, are similarly generated by a plurality of oscillators, so that the final oscillator 22 represents the *n*th digit or bit input, and operates at a frequency $f_n$. By connecting each of oscillators 20–22 to a frequency modulator 24, such as a reactance tube modulator, a composite modulating signal is furnished from frequency modulator 24 to a carrier frequency oscillator 25 operating, when unmodulated, at a frequency $f_C$. In this manner, the output frequency of oscillator 25 is varied in accordance with the various input signals supplied to frequency modulator 24. The output signal produced by oscillator 25 is furnished through a half-wave rectifier such as a diode 26, to vertical deflection plates 18 of recording chamber 11. In addition, a sawtooth waveform generator 27 is connected to deflection plates 17, and serves to provide the electron beam produced by electron source 15 with a uniform, constant speed horizontal sweep.

In order to maintain constant depth deformation lines in the gratings to be recorded, a constant positive potential must be maintained on anode 31 during recording of grating lines. Similarly, if it is desired to employ anode 31 in turning the electron beam on and off, a negative potential is preferably applied to anode 31 during intervals occurring between recording of any two consecutively recorded lines. Accordingly, positive potential is furnished through a gate 33 which is rendered conductive by a flip-flop circuit 35 when in the SET or S condition. Similarly, negative potential is furnished through a gate 34 which is rendered conductive by flip-flop circuit 35 when in the RESET or R condition. Flip-flop circuit 35 is driven into the SET condition by positive pulses formed by a series-connected capacitor 36 and diode 37 whenever an amplitude threshold detector circuit 38 is actuated by signals furnished thereto through diode 26, while the flip-flop circuit is maintained in the RESET during presence of output signals from an amplitude threshold detector circuit 39 also actuated by signals furnished through diode 26.

In operation, assume first that no input signals are supplied to frequency modulator 24; that is, that no bits are to be recorded. During generation of each sawtooth wave by generator 27, the electron beam is displaced horizontally across photosensitive-recording medium 10, here assumed to be thermoplastic film, before the film has had sufficient time to be moved for any significant distance by capstans 12. Concurrently, the electron beam impinging on the heat-softened thermoplastic film through aperture 16 is deflected vertically a number of times in accordance with the frequency of oscillator 25. Each vertical deflection of the electron beam extends over a predetermined distance on film 10, which is equal to the vertical length of each line being recorded. This uniform length is a result of the beam being turned on when the vertical deflection voltage reaches a predetermined value, herein termed the low threshold, and being cut off when the vertical deflection voltage reaches a second predetermined value, herein termed the high threshold. The beam is deflected in only one direction from a zero or base line, due to the presence of half-wave rectifier 26. Thus, when the positive beam deflection voltage reaches the low threshold level, an output voltage is produced by low threshold detector 38. A pulse is thereupon passed by capacitor 36, due to the abrupt rise of the output signal from low threshold detector 38. This rise, being in the positive direction, is coupled through diode 37 to set flip-flop circuit 35. The flip-flop circuit then renders gate 33 conductive, so that a positive potential is applied through the gate to anode 31, accelerating electrons produced by cathode 15.

As the output signal from oscillator 25 continues to increase in amplitude in the positive direction, high threshold detector 39 is actuated, so that an output signal is furnished therefrom to flip-flop circuit 35, resetting the flip-flop. This renders gate 33 nonconductive and gate 34 conductive, so that the potential on anode 31 is abruptly changed from positive to negative. This negative potential prevents electrons from being emitted through aperture 32 of anode 31, thereby cutting off the electron beam.

When the output signal from oscillator 25 subsequently decreases in amplitude below the high threshold, the output signal from high threshold detector 39 ceases. However, flip-flop circuit 35 remains in the RESET condition, so that no electrons are passed through aperture 32 in anode 31. As the amplitude of output signal from oscillator 25 diminishes below the low threshold level, the output signal from low threshold detector 38 ceases. However, the abrupt fall time of the low threshold detector output signal produces a negative pulse through capacitor 36, which is blocked by diode 37. Thus, flip-flop circuit 35 remains in the RESET condition and the electron beam in recording chamber 11 remains inhibited.

The negative swing of the output signal from oscillator 25 leaves both high and low threshold detectors 39 and 38 respectively in the zero output condition, due to the presence of half-wave rectifier 26. Therefore, until the output signal from oscillator 25 again increases in the positive direction, no electrons are passed through aperture 32 in anode 31, so that, during this interval, no recording takes place on thermoplastic film 10. The net result of this type of operation is that a plurality of vertical lines having substantially uniform length are recorded in the form of charges deposited on thermoplastic film 10. Due to the assumed absence of modulating frequencies, the constant frequency output signal from oscillator 25 constrains these lines to be equidistant from each other across the entire track or frame recorded during one complete sweep produced by sawtooth waveform generator 27.

As the film advances in recording chamber 11, it passes over the heated capstan 12 immediately ahead of takeup reel 14. Thus, the thermoplastic coating is liquified so as to permit deformation in accordance with the charge deposited thereon by the electron beam. Upon cooling, which occurs in the vicinity immediately ahead of takeup reel 14 to a sufficient extent to permit the thermoplastic coating to harden prior to the film being wound on takeup reel 14, the film acquires a uniform optical diffraction grating in the form of regularly spaced deformation images of lines recorded thereon. This grating is thus unmodulated.

In the event one or more bits of data are to be recorded, those oscillators of the group of oscillators 20–22 corresponding to the bits to be recorded, are energized. A linear superposition of output frequencies thus occurs in frequency modulator 24, and the output frequency of oscillator 25 is modulated accordingly. The output signal of oscillator 25, after being rectified by half-wave rectifier 26, is applied to vertical deflection plates 18, so as to vertically deflect the electron beam passing from electron source 15 to aperture 16 in accordance with the output frequency of oscillator 25. Under these conditions, the frequency-modulated signal which is applied to deflection plates 18 is converted to vertical deflections of the electron beam occurring at predetermined points in time; that is, for each frame, a linear horizontal time base is generated by sawtooth generator 27 and at different instants along this base, depending upon the composite output frequency of oscillator 25, the electron beam is vertically deflected. Thus, a plurality of vertically directed lines are recorded on thermoplastic tape 10 to form a diffraction grating. Although the lengths of the vertically directed lines are uniform, as described supra, the spacing between each pair of adjacent vertically directed lines of the grating is modulated in accordance with the input data furnished to the system. Consequently, information is contained in the spacing of the lines of the grating in each frame. It should be noted that the positive voltage applied to the accelerating electrode for the electron beam, which in this instance is anode 31, is maintained constant in order that the depth of deformation of the thermoplastic material be kept constant. The resulting form of modulation is similar to that which would occur if only the phase of the diffraction grating were modulated. The result of recording several frames containing modulated information is illustrated in FIG. 2.

Figure 2:
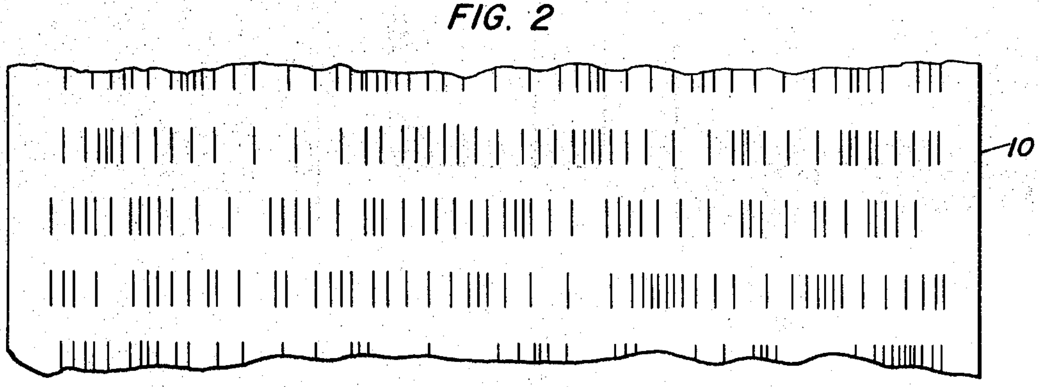
FIG. 2 is an illustration of data as recorded in the form of optical diffraction gratings on a radiation-responsive medium.

In FIG. 2, thermoplastic film 10 is shown in plan view, greatly enlarged. Each row of vertical lines, which comprises a diffraction grating, is herein termed a frame, inasmuch as recording of the entire row preferably occurs before the thermoplastic film has had sufficient time to travel for any significant distance in the recorder. The spacing between adjacent lines of the gratings is seen to be variable, due to the frequency modulation of the carrier signal used for recording. As previously described, the lines of the gratings are all of equal depth in the thermoplastic material, due to control of the intensity of the electron beam in the recording apparatus, while the lines of the gratings are all of substantially equal length because of the threshold detector circuitry through which the frequency-modulated carrier signal controls emergence of electrons through aperture 32 in anode 31 of recording chamber 11. With rows of diffraction line gratings recorded across the width of the film, and with the grating lines running substantially parallel to the length of the film, diffraction of monochromatic light impinging upon the film occurs between parallel planes which are perpendicular to the lengths of the grating lines.

Assuming that the thermoplastic film has a 300 line per millimeter resolution, then each row of diffraction gratings is capable of storing up to a 70 bit word containing frequencies from 80 to 150 lines per millimeter, at 1 line per millimeter separation. Storage at this bit density level requires a diffraction grating 10-millimeters long and 16-microns wide, which is easily obtainable, and provides a redundancy of about 10, where redundancy is defined as the ratio of the closest possible distance between two adjacent spots of diffracted light in the readout plane to the width of these diffracted spots. The bit density thus obtainable, assuming higher diffraction orders are generated, is approximately $1.4\times10^5$ bits per square inch. However, higher order optical diffraction images are drastically reduced with linear recording of the information. With this type of recording, which is obtained when the diffraction gratings are maintained at uniform depth in the thermoplastic material, a bit density as high as $3\times10^5$ bits per square inch can be achieved. Of course, higher storage capacity can be achieved by employing thermoplastic film of higher resolution.

Figure 3:
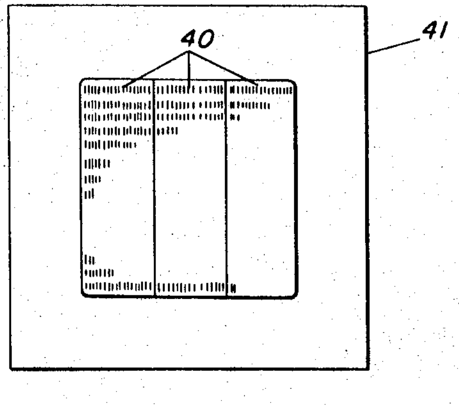
FIG. 3 is an illustration of a matrix of recorded data constructed by arranging, side by side, strips of the photosensitive medium on which optical diffraction gratings have been recorded.

In FIG. 3, a matrix of optical diffraction gratings is illustrated. The matrix comprises a plurality of segments 40 of film mounted on a supporting structure 41. Structure 41 contains an open interior region over which segments 40 are mounted. These segments are situated side by side, with their frames or rows of diffraction gratings in horizontal alignment with each other. Segments 40 are preferably cut from the thermoplastic film on which the optical diffraction gratings are recorded after a predetermined number of such gratings have been recorded thereon.

Figure 4:
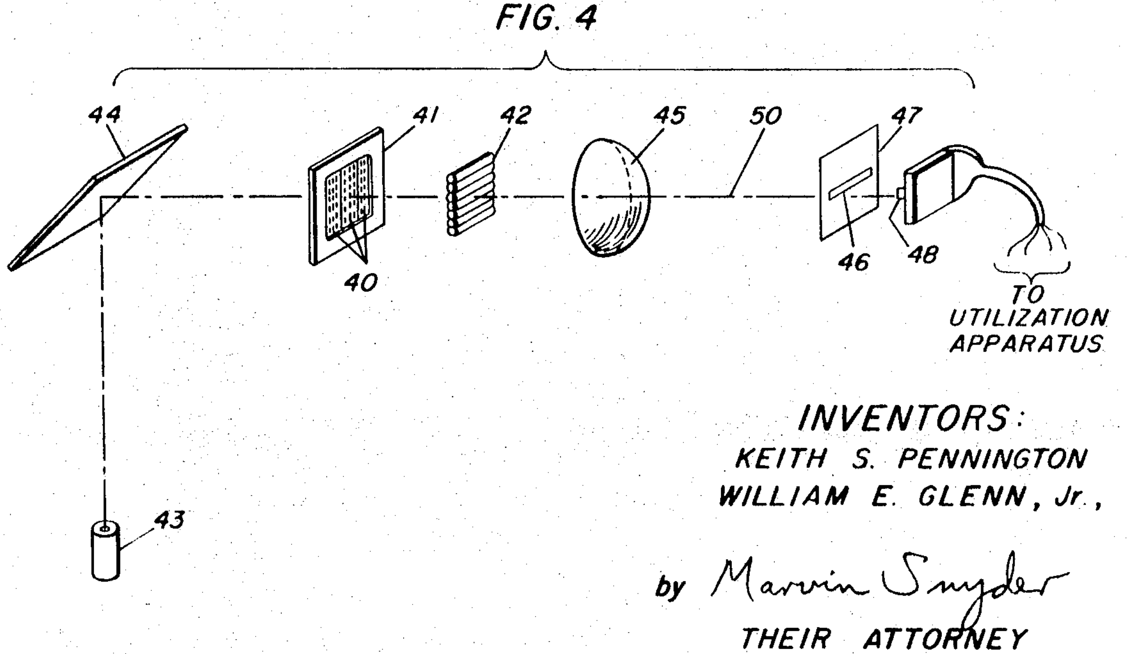
FIG. 4 is a schematic illustration of a system for providing random access retrieval of data from a memory matrix of optical diffraction gratings.

FIG. 4 schematically illustrates apparatus for optically reading out data stored in the matrix of film segments 40 mounted on structure 41. Positioned in front of structure 41 is an array 42 of cylindrical lenses, also referred to as a lenticular screen. The longitudinal axes of the cylindrical lenses are parallel to the aligned recorded frames and are arranged in a one-to-one relationship with each of the aligned frames; that is, there is provided one cylindrical lens for each row of diffraction gratings extending across the matrix held by support structure 41. A source of monochromatic light 43, typically a laser, is situated behind structure 41 and arranged to direct a narrow beam of light onto the reflecting surface of a mirror 44. Mirror 44 is positioned to direct the beam of light from laser 43 onto any portion of segments 40 in support structure 41.

Laser 43 may be of the scanning variety so that the beam of light emitted therefrom is controllably directable onto any single frame recorded on segments 40 with mirror 44 maintained stationary. On the other hand, laser 43 may be of the nonscanning variety, in which case mirror 40 is hinged to provide two degrees of freedom so as to enable the mirror to controllably direct light from laser 43 onto any single frame on the matrix made up of film segments 40; that is, the mirror is capable of selectively reflecting the laser beam in both the horizontal and vertical directions. As yet another alternative, laser 43 may be of the scanning variety with but one degree of freedom. In this latter alternative, mirror 44 is hinged to provide only one degree of freedom so as to furnish a capability of reflecting light through a plane perpendicular to the plane through which the light emitted by laser 43 can be scanned.

Ahead of lenticular screen 42 is situated a spherical lens 45 which focuses light emerging from lenticular screen 42 through a rectangular aperture 46 in an opaque plate 47 onto a row of photodetector 48, the light-sensitive surfaces of which are situated in the readout plane of the system shown in FIG. 4. Photodetectors 48 may comprise one photodiode for each bit recorded in any frame on any segment of film supported on structure 41. In order to achieve the desired reduction in size of the system, photodetectors 48 preferably are formed as photodiodes on a semiconductor chip by use of microelectronic fabrication methods. Photodetectors 48 are displaced from optic axis 50 of lens 45 so as to detect first order images and be unaffected by zero order images. This displacement, therefore, is in the readout plane, an imaginary plane situated normal to the lines of the gratings in the frame recorded on film segments 40 and passing through optic axis 50, and hence the displacement is parallel to the longitudinal axes of the cylindrical lenses in lenticular screen 42.

In operation, coherent light from laser 43 is reflected by mirror 44 onto a selected frame on any of film segments 40. The illuminated frame diffracts the light impinging thereon, in accordance with the data stored in the illuminated frame. The diffracted light emanating from the selected frame falls upon a cylindrical lens of lenticular screen 42 and is focused by this lens in a vertical direction. Being that screen 42 comprises horizontally oriented cylindrical lenses, these lenses have substantially no effect in the horizontal direction upon light diffracted by the gratings on film segments 40.

Light emerging from lenticular screen 42 is focused by spherical lens 45 through aperture 46 in plate 47 onto the detecting surfaces of the row of photodiodes 48. Illumination of each photodiode represents detection of a ONE bit, while the nonilluminated condition of a photodiode represents detection of a ZERO bit. The output leads from photodiode array 48 are conveniently wired to utilization apparatus. In the alternative, an optical scanning device may be utilized instead of photodiodes 48 ahead of plate 47, allowing the diffracted light pattern passing through aperture 46 to be quickly scanned.

Random access to information stored in the matrix of diffraction gratings in the system of FIG. 4 is provided since the collimated beam of monochromatic light produced by laser 43 may be selectively made to impinge upon any frame arranged in the matrix formed by film segments 40 substantially instantaneously. Moreover, multichannel access may be provided, since interrogation can also be produced with another collimated beam of monochromatic light inclined relative to the first collimated beam. The diffracted light is then sampled at another aperture similar to, but displaced from, aperture 46.

In the event a reflective type of thermoplastic film were to be utilized instead of a light-transmissive type, mirror 44 would reflect collimated light from laser 43 onto the matrix of film segments 40 at an angle displaced from the normal thereto. Accordingly, lenticular screen 42, spherical lens 45, apertured plate 47 and photodetector array 48 would be aligned on the same side of film segments 40 as laser 43 and mirror 44, but along an optic axis making an angle with the plane of film segments 40 equal and opposite to the angle made with the plane of film segments 40 by the beam of collimated light reflected from mirror 44 onto film segments 40. Moreover, regardless of whether film segments 40 are light reflective or light transmissive, a large storage array may be more conveniently utilized with a spherical reflector instead of spherical lens 45.

The foregoing described a large capacity random access memory capable of rapidly accomplishing storage and retrieval of data in digital form. Data are stored in the form of optical diffraction gratings and high bit storage capacity is achieved by avoiding appreciable generation of higher diffracted orders. The system stores data in the form of line gratings wherein modulation is contained solely in the spacings between adjacent lines of the gratings.

While only certain preferred features of the invention have been shown by way of illustration, many modifications and changes will occur to those skilled in the art. It is, therefore, to be understood that the appended claims are intended to cover all such modifications and changes as fall within the true spirit and scope of the invention.

We claim:

1. A random access system for information storage and retrieval comprising:
 - a radiation-responsive medium;
 - a source of frequency-modulated carrier signal, the frequency modulations of which represent information to be stored;
 - recording means for recording on said radiation-responsive medium the frequency-modulated carrier signal from said source as an optical diffraction grating wherein the spacing between adjacent parallel lines varies in accordance with said frequency modulations; and
 - optical means for selectively reading out the line space variations of said grating and, hence, the stored information.

2. The random access system for data storage and retrieval of claim 1 wherein said optical means comprises: a source of substantially monochromatic collimated light; means for selectively directing said monochromatic collimated light onto any one of said recorded gratings; photodetecting means; and means for focusing light emanating from said one of said gratings onto said photodetecting means so as to produce electrical output signals from said photodetecting means in accordance with the data stored in said one of said gratings.

3. A random access system for data storage and retrieval as set forth in claim 2 wherein said recording means comprises:
 - means for producing an electron beam;
 - first deflection means for progressively deflecting said electron beam in a first direction across said radiation responsive medium;
 - second deflection means for deflecting said electron beam in a second direction, orthogonal to said first direction.

4. A random access system for data storage and retrieval as set forth in claim 3 wherein said source of frequency-modulated carrier signal comprises:
 - a carrier signal source coupled to said second deflection means;
 - a plurality of oscillators, each oscillator having a different frequency of operation, wherein each frequency of operation represents data to be stored; and
 - modulating means, coupling said plurality of oscillators to said carrier signal source, for modulating the output frequency of said carrier frequency source.

5. The random access system for data storage and retrieval of claim 2 wherein said radiation-responsive medium comprises a thermoplastic film.

6. The random access system for data storage and retrieval of claim 3 wherein said radiation-responsive medium comprises a thermoplastic film.

7. The random access system for data storage and retrieval of claim 4 wherein said radiation-responsive medium comprises a thermoplastic film.

8. The random access system for data storage and retrieval of claim 6 including means for accelerating said electrons with constant voltage so that said electrons strike said thermoplastic film with uniform intensity.

9. The random access system for data storage and retrieval of claim 7 including means for accelerating said electrons with constant voltage so that said electrons strike said thermoplastic film with uniform intensity, said means for accelerating said electrons being rendered operative by said carrier signal source only when amplitude of the carrier signal produced by said carrier signal source is between predetermined constant values.

10. A random access system for data storage and retrieval as set forth in claim 1 wherein said recording means produces a plurality of said optical diffraction gratings and said plurality of optical diffraction gratings are arranged in a matrix of rows and columns.

11. The random access date storage and retrieval system of claim 10 wherein said optical means for selectively retrieving stored date from said matrix of optical diffraction gratings comprises: a source of substantially monochromatic collimated light; means for selectively directing said monochromatic collimated light onto any one of said gratings in said matrix; photodetecting means; and means for focusing light emanating from said one of said gratings onto said photodetecting means so as to produce electrical output signals from said photodetecting means in accordance with the data stored in said one of said gratings.

12. The random access data storage and retrieval system of claim 10 wherein said each of said gratings comprises parallel grooves formed of substantially uniform depth in a recording medium.

13. The random access data storage and retrieval system of claim 11 wherein said each of said gratings comprises parallel grooves formed of substantially uniform depth in a recording medium.

14. The random access data storage and retrieval system of claim 10 wherein said each of said gratings comprises parallel grooves formed of substantially uniform length and depth in a recording medium.

15. The random access data storage and retrieval system of claim 11 wherein said each of said gratings comprises parallel grooves formed substantially uniform length and depth in a recording medium.

16. The random access data storage and retrieval system of claim 10 wherein said optical means for selectively retrieving stored data from said matrix of optical diffraction gratings comprises: at least one beam of laser light; means for selectively directing each beam of said laser light onto any respective one of said gratings in said matrix; at least one photosensitive apparatus; and means for focusing light emanating from said respective one of said gratings onto a respective photosensitive apparatus so as to produce electrical output signals from said respective photosensitive apparatus in accordance with the data stored in said respective one of said gratings.

17. The random access data storage and retrieval system of claim 16 wherein said focusing means comprises optically aligned cylindrical and spherical lens units disposed between said gratings and said photosensitive apparatus.

18. Apparatus for recording on a radiation-responsive medium optical diffraction gratings wherein spacing between lines of each of the gratings is controllably variable in accordance with signals representing data to be stored, said apparatus comprising:
 - an evacuated recording chamber;

an electron source situated within said chamber;

means for positioning said medium within said chamber to permit electrons from said electron source to impinge upon said medium;

means for directing said electrons toward positions progressing horizontally across said recording medium;

electron deflection means for deflecting said electrons vertically;

signal-generating means for producing a constant frequency AC waveform;

means for generating a plurality of diverse waveforms each having at least one characteristic representative of data to be stored;

means coupled to said signal-generating means for frequency modulating the output signal from said signal-generating means with selected ones of said plurality of diverse waveforms dependent upon data to be stored in a selected diffraction grating; and means coupling said frequency-modulated waveform to said electron deflection means to produce diffraction gratings in said radiation-responsive medium at locations determined by a threshold level in said frequency-modulated AC waveform.

19. The apparatus of claim 18 including half-wave rectifying means coupling said signal-generating means to said electron deflection means.

20. The apparatus of claim 18 including electron-accelerating means, and switching means coupling said signal-generating means to said electron-accelerating means, said switching means applying an electron-accelerating potential to said electron-accelerating means only when the amplitude of signal produced by said frequency modulating means is between predetermined constant values.

21. The apparatus of claim 19 including electron-accelerating means, and switching means coupling said half-wave rectifying means to said electron-accelerating means, said switching means applying an electron-accelerating potential to said electron-accelerating means only when the amplitude of signal produced by said frequency-modulating means is between predetermined constant values.

* * * * *